E. A. MOORE.
STRIPING DEVICE.
APPLICATION FILED APR. 30, 1915.

1,159,979.

Patented Nov. 9, 1915.

Witnesses
Minnie Montanye
Katherine Stone

Inventor
Eugene A. Moore
by Walter E. Ward
Atty.

UNITED STATES PATENT OFFICE.

EUGENE A. MOORE, OF UNADILLA, NEW YORK.

STRIPING DEVICE.

1,159,979.

Specification of Letters Patent.

Patented Nov. 9, 1915.

Application filed April 30, 1915. Serial No. 24,940.

*To all whom it may concern:*

Be it known that I, EUGENE A. MOORE, a citizen of the United States, residing at Unadilla, in the county of Otsego and State of New York, have invented certain new and useful Improvements in Striping Devices, of which the following is a specification.

Figure 1:
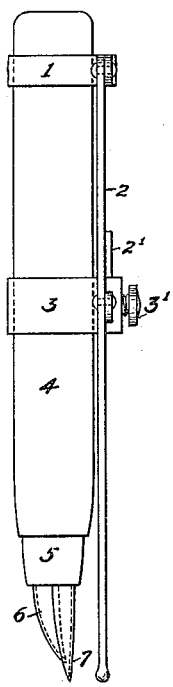
Figure 2:
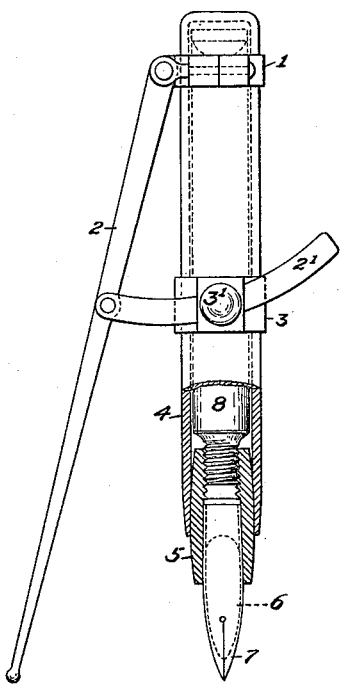

My invention relates to devices used in striping carriages, sleighs and other vehicles, and the objects of my invention are to produce a simple and light device by which the stripes used on such vehicles may be readily applied thereon in a convenient and uniform manner with proper alinement, and which device will be of simple construction and easily used. I obtain these objects by means of the device shown in the accompanying drawings, in which, Figure 1 is a side elevation. Fig. 2 is a front elevation of my striping device partly in section.

My device consists principally of a tube in which the paint to be used for the stripe is placed. This tube is inclosed in an outside casing. Attached to the tube is a feeding lip into which the paint flows from the tube. Over this feeding lip I fasten, in any suitable manner, a striping or lining pen which is supplied with paint from the feeding lip. Attached to the casing surrounding the tube is a gage, which may be set at any desired angle to said casing, and the end of the gage follow along a straight edge, molding or spoke of the vehicle as may be most convenient to make true lines at the proper positions, as may be desired.

Referring to the drawings, 8 represents the tube which contains the paint to be used for producing the stripe. Several tubes containing the same or different colored paints may be prepared and one at a time used, as may be desired.

5 is a shield or guard, which is attached to the tube by screw threads, or otherwise, and upon which the feeding lip 6 is adjusted and which guard also holds the striping pen 7 in proper position over the feeding lip so as to keep the pen properly provided with paint from the tube.

4 is a casing surrounding the tube and partially surrounding the guard 5. This casing incloses the tube 8 and fits around the guard 5 in making a tight joint to prevent leakage. Around the casing 4 is the ring 3. This ring is attached near the center of the casing, at a suitable distance between two ends thereof. Near the end of the casing, opposite from the pen, is the ring 1 and hinged to the ring 1 is the gage 2. This gage is pivoted to the ring 1 in any suitable manner, preferably by an eye bolt, as shown in Fig. 2. Attached to the gage 2 is the arm $2^1$. This arm passes through a slot located in the ring 3, or a projection thereof or an attachment thereto.

$3^1$ is a thumb screw passing into or through said slot by which the arm $2^1$ may be held in any desired position so as to hold the gage 2 rigidly in position. The ring 1 may be withdrawn from the casing 4 and replaced reversely thereon so that the gage 2 will be on either side of the device. At the same time the arm will be withdrawn from the slot and may be entered into the slot from the other side so that the pen may be used for painting stripes or lining right or left handed and gage 2 will follow the molding or straight edge on either side.

Constructed in this way my striping device may be readily used for either right or left handed work and the gage adjusted, as may be desired, for either side and will follow the straight edge or molding as may be most convenient for the workman; the tube, at the same time, will convey the paint into the feeding lip and from the lip to the striping pen so as to be in condition and ready for work at any time desired and in the most convenient manner. Tubes containing various colors of paint may be provided to be inserted in the casing as occasion requires and as may be desired.

What I claim as my invention and desire to secure by Letters Patent is,

1. In a striping device a tube adapted to contain liquid paint; a feeding lip adapted to feed said liquid paint to a striping pen; a striping pen; a casing surrounding said tube; means for retaining said feeding lip, in connection with said tube, by said casing; a reversing ring surrounding said casing; a gage pivotally attached to said ring and means for connecting said gage at various angles with said casing.

2. In a striping device a tube adapted to contain liquid paint; a feeding lip adapted to feed said liquid paint to a striping pen; a striping pen; a casing surrounding said tube; means for retaining said feeding lip, in connection with said tube, by said casing; a gage; means for pivotally connecting said gage to said casing; a ring surrounding said casing; an arm attached to said gage and means for attaching said arm slidably to said ring whereby said gage may be held at any desired angle to said casing.

3. In a striping device a tube adapted to contain liquid paint; a feeding lip adapted to feed said liquid paint to a striping pen; a striping pen; a casing surrounding said tube; means for retaining said feeding lip, in connection with said tube, by said casing; a removable ring adapted to fit on said casing; a gage pivotally attached to said ring; an arm attached to said gage; a second ring surrounding said casing; means for attaching said arm slidably to said ring whereby said gage may be held at any desired angle to said casing; said removable ring adapted to be removed from said casing and placed thereon in a reverse position whereby said gage will be upon the opposite side of said casing, substantially as described and for the purposes set forth.

In testimony whereof I affix my signature in presence of two witnesses.

EUGENE A. MOORE.

Witnesses:
WALTER E. WARD,
MINNIE MONTANYE.

Copies of this patent may be obtained for five cents each, by addressing the "Commissioner of Patents, Washington, D. C."